US012771079B2

(12) United States Patent
Sahib et al.

(10) Patent No.: US 12,771,079 B2
(45) Date of Patent: Oct. 20, 2026

(54) HIGH-VOLTAGE CONNECTOR HAVING A PRE-CHARGE RESISTOR

(71) Applicant: GM GLOBAL TECHNOLOGY OPERATIONS LLC, Detroit, MI (US)

(72) Inventors: Amar Sahib, Orion Township, MI (US); Robert J. Heydel, Clawson, MI (US); William R. Cawthorne, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 383 days.

(21) Appl. No.: 18/539,571

(22) Filed: Dec. 14, 2023

(65) Prior Publication Data

US 2025/0202168 A1 Jun. 19, 2025

(51) Int. Cl.

| | |
|---|---|
| ***H01R 13/66*** | (2006.01) |
| ***B60R 16/03*** | (2006.01) |
| ***H01R 13/703*** | (2006.01) |

(52) U.S. Cl.

CPC ......... *H01R 13/6616* (2013.01); *B60R 16/03* (2013.01); *H01R 13/703* (2013.01); *H01R 2201/26* (2013.01)

(58) Field of Classification Search

None

See application file for complete search history.

(56) References Cited

U.S. PATENT DOCUMENTS 6,310,410 B1 * 10/2001 Lin ........................ H02H 9/004 307/119

FOREIGN PATENT DOCUMENTS

| | | | |
|---|---|---|---|
| DE | 202015106121 | U1 | 2/2017 |
| JP | H08162221 | A | 6/1996 |
| JP | H0992401 | A | 4/1997 |

OTHER PUBLICATIONS

Machine translation of JPH08162221, Tabata, Battery Connection Connector, Jun. 21, 1996 (Year: 1996).*

German Office Action for German Application No. 102024102649. 9; dated Dec. 23, 2024; 9 pages.

* cited by examiner

*Primary Examiner* — Ross N Gushi

(74) *Attorney, Agent, or Firm* — CANTOR COLBURN LLP

(57) ABSTRACT

Embodiments include a high-voltage connector having a first member electrically connected to a high-voltage source, the first member includes a first positive conductor and a second positive conductor and a first negative conductor and a second negative conductor and a second member electrically connected to a load that requires pre-charging, the second member includes a third positive conductor and a fourth positive conductor connected in parallel and a third negative conductor and a fourth negative conductor connected in parallel. The high-voltage connector also includes a pre-charge resistor disposed within one of the first member and the second member. The first member is configured to connect to the second member and to provide electrical power from the high-voltage source to the load.

18 Claims, 8 Drawing Sheets

HIGH-VOLTAGE CONNECTOR HAVING A PRE-CHARGE RESISTOR

INTRODUCTION

The disclosure relates to electrical connectors. More specifically, the disclosure relates to a high-voltage electrical connector for use in connecting to capacitive loads.

Connecting a high-voltage source to a capacitive load can cause an in rush of current to the capacitive load, which may result in damage to the capacitive load or to switches or connectors. Accordingly, a pre-charge circuit is often added to the capacitive load to prevent a damaging in rush of current. These pre-charge circuits often include one or more relays and a pre-charge resistor. In many cases, the relays are electrically controlled relays that require energy to operate.

SUMMARY

In one exemplary embodiment, a high-voltage connector is provided. The high-voltage connector includes a first member electrically connected to a high-voltage source, the first member includes a first positive conductor and a second positive conductor and a first negative conductor and a second negative conductor and a second member electrically connected to a load that requires pre-charging, the second member includes a third positive conductor and a fourth positive conductor connected in parallel and a third negative conductor and a fourth negative conductor connected in parallel. The high-voltage connector also includes a pre-charge resistor disposed within one of the first member and the second member, the pre-charge resistor connected to one of the first positive conductor, the second positive conductor, the third positive conductor, the fourth positive conductor, the first negative conductor, the second negative conductor, the third negative conductor, and the fourth negative conductor. The first member is configured to connect to the second member and to provide electrical power from the high-voltage source to the load.

In addition to the one or more features described herein the first positive conductor extends from the first member by a first distance and the second positive conductor extends from the first member by a second distance, wherein the second distance is greater than the first distance and wherein the pre-charge resistor is connected to the second positive conductor.

In addition to the one or more features described herein the third positive conductor extends from the second member by a third distance and the fourth positive conductor extends from the second member by a fourth distance, wherein the fourth distance is greater than the third distance.

In addition to the one or more features described herein the high-voltage connector also includes a first mechanically actuated switch configured to be open when the first member is separated from the second member and to be closed by the first member connecting to the second member.

In addition to the one or more features described herein the first mechanically actuated switch is connected in series with the pre-charge resistor.

In addition to the one or more features described herein the high-voltage connector also includes a second mechanically actuated switch configured to be open when the first member is separated from the second member and to be closed by the first member connecting to the second member.

In addition to the one or more features described herein the first mechanically actuated switch is configured to close before the second mechanically actuated switch as the first member is connected to the second member.

In one exemplary embodiment, an electric vehicle having a high-voltage battery, a load that requires pre-charging, and a high-voltage connector is provided. The high-voltage connector includes a first member electrically connected to a high-voltage source, the first member includes a first positive conductor and a second positive conductor and a first negative conductor and a second negative conductor and a second member electrically connected to a load that requires pre-charging, the second member includes a third positive conductor and a fourth positive conductor connected in parallel and a third negative conductor and a fourth negative conductor connected in parallel. The high-voltage connector also includes a pre-charge resistor disposed within one of the first member and the second member, the pre-charge resistor connected to one of the first positive conductor, the second positive conductor, the third positive conductor, the fourth positive conductor, the first negative conductor, the second negative conductor, the third negative conductor, and the fourth negative conductor. The first member is configured to connect to the second member and to provide electrical power from the high-voltage source to the load.

In addition to the one or more features described herein the first positive conductor extends from the first member by a first distance and the second positive conductor extends from the first member by a second distance, wherein the second distance is greater than the first distance and wherein the pre-charge resistor is connected to the second positive conductor.

In addition to the one or more features described herein the third positive conductor extends from the second member by a third distance and the fourth positive conductor extends from the second member by a fourth distance, wherein the fourth distance is greater than the third distance.

In addition to the one or more features described herein the high-voltage connector further includes a first mechanically actuated switch configured to be open when the first member is separated from the second member and to be closed by the first member connecting to the second member.

In addition to the one or more features described herein the first mechanically actuated switch is connected in series with the pre-charge resistor.

In addition to the one or more features described herein the high-voltage connector further includes a second mechanically actuated switch configured to be open when the first member is separated from the second member and to be closed by the first member connecting to the second member.

In addition to the one or more features described herein the first mechanically actuated switch is configured to close before the second mechanically actuated switch as the first member is connected to the second member.

In one exemplary embodiment, an electrical connector is provided. The electrical connector includes a first member electrically connected to a high-voltage source, the first member includes a first positive conductor and a second positive conductor and a first negative conductor, a second member electrically connected to a load that requires pre-charging, the second member includes a third positive conductor and a second positive conductor and a third negative conductor, and a pre-charge resistor disposed within one of the first member and the second member, the pre-charge resistor connected in series between the second positive conductor and the high-voltage source. The first member is configured to connect to the second member and to provide electrical power from the high-voltage source to the load.

In addition to the one or more features described herein the first positive conductor extends from the first member by a first distance and the second positive conductor extends from the first member by a second distance, wherein the second distance is greater than the first distance and wherein the pre-charge resistor is connected to the second positive conductor.

In addition to the one or more features described herein the third positive conductor extends from the second member by a third distance and the fourth positive conductor extends from the second member by a fourth distance, wherein the fourth distance is greater than the third distance.

In addition to the one or more features described herein the electrical connector also includes a first mechanically actuated switch configured to be open when the first member is separated from the second member and to be closed by the first member connecting to the second member.

In addition to the one or more features described herein the first mechanically actuated switch is connected in series with the pre-charge resistor.

In addition to the one or more features described herein the electrical connector also includes a second mechanically actuated switch configured to be open when the first member is separated from the second member and to be closed by the first member connecting to the second member.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
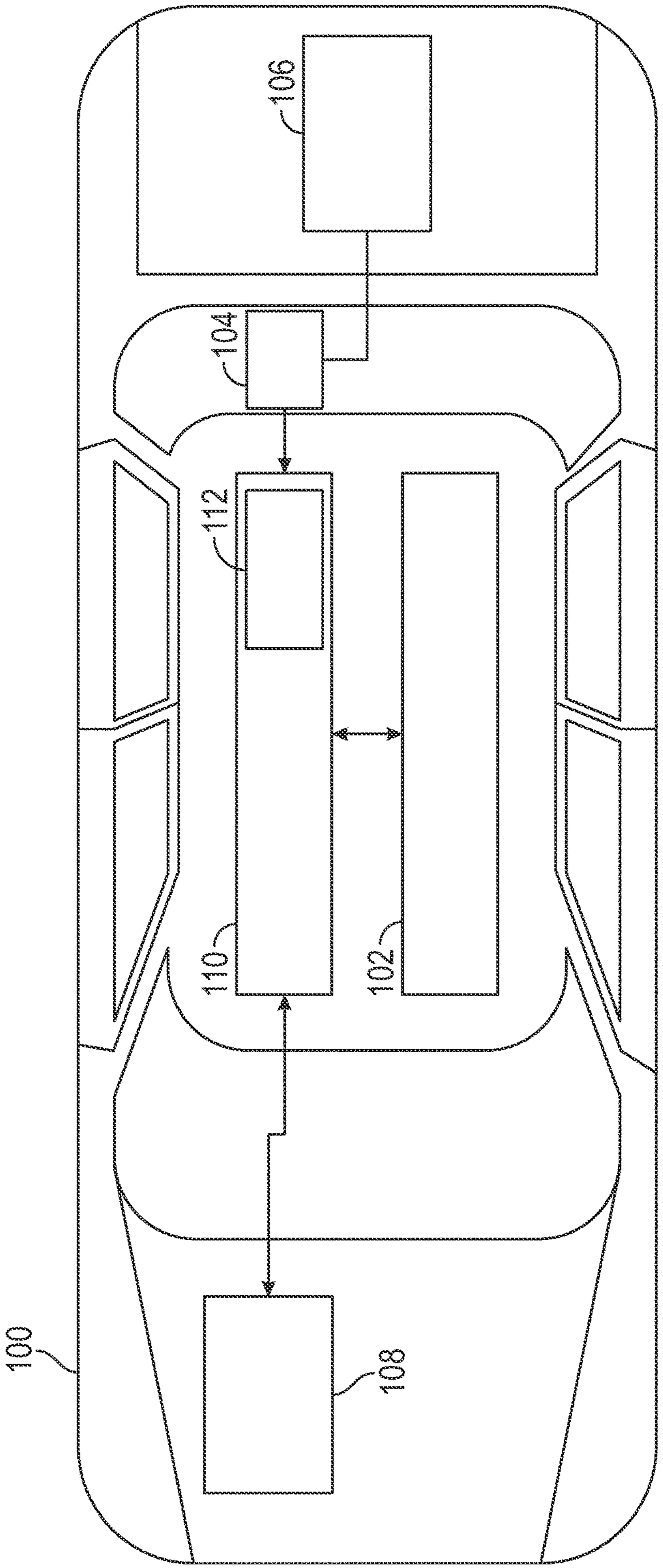
FIG. 1 is a schematic diagram of an electric vehicle in accordance with an exemplary embodiment.

The following description is merely exemplary in nature and is not intended to limit the present disclosure, its application or uses. Various embodiments of the disclosure are described herein with reference to the related drawings. Alternative embodiments of the disclosure can be devised without departing from the scope of the claims. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship.

As discussed herein, a pre-charge circuit that includes one or more relays is often added to the capacitive load to prevent a damaging in rush of current. In many cases, the relays are electrically controlled relays that require energy to operate. Over time, a relatively large amount of energy is used to operate the relays of the pre-charge circuit. Accordingly, a more energy-efficient manner of preventing a current in rush from occurring when connecting a high-voltage source to a capacitive load is desired.

Embodiments of the disclosure include high-voltage connectors that include a pre-charge resistor that is configured to limit a current in rush to a load that requires pre-charging, such as a capacitive load. In exemplary embodiments, the high-voltage connectors include a first member that is electrically connected to a high-voltage load that is configured to connect to a second member that is electrically connected to a capacitive load. The first member includes one or more positive conductors that are configured to connect with one or more positive conductors of the second member. Likewise, the first member includes one or more negative conductors that are configured to connect with one or more negative conductors of the second member.

In exemplary embodiments, the pre-charge resistor is connected to one of the conductors such that an electrical connection between the first member and the second member is formed via the one of the conductors including the pre-charge resistor before an electrical connection is formed between the other conductors. As a result, the current flowing from the first member to the second member when the electrical connection is formed is limited by the pre-charge resistor and therefore does not cause a current in rush to the capacitive load.

Referring now to FIG. 1, a schematic diagram of an electric vehicle 100 according to one or more embodiments is shown. As illustrated, the electric vehicle 100 includes a battery pack 106 that is connected to an electrical distribution system 110 via a high-voltage connector 104. In exemplary embodiments, the battery pack 106 is a high-voltage source and has a voltage in excess of two hundred volts. In exemplary embodiments, the electrical distribution system 110 includes at least one capacitive load 112, such as a direct current (DC) to DC converter. The electrical distribution system 110 is connected to an electric motor 108 that is configured to provide propulsion to the electric vehicle 100 by drawing power from the battery pack 106. The electric vehicle 100 also includes a controller 102, which is one of a general-purpose processor, a Field programmable gate array (FPGA), an application-specific integrated circuit (ASIC), and the like. The controller 102 is configured to control the operation of one or more of the electric motor 108 and the electrical distribution system 110.

Figure 2A:
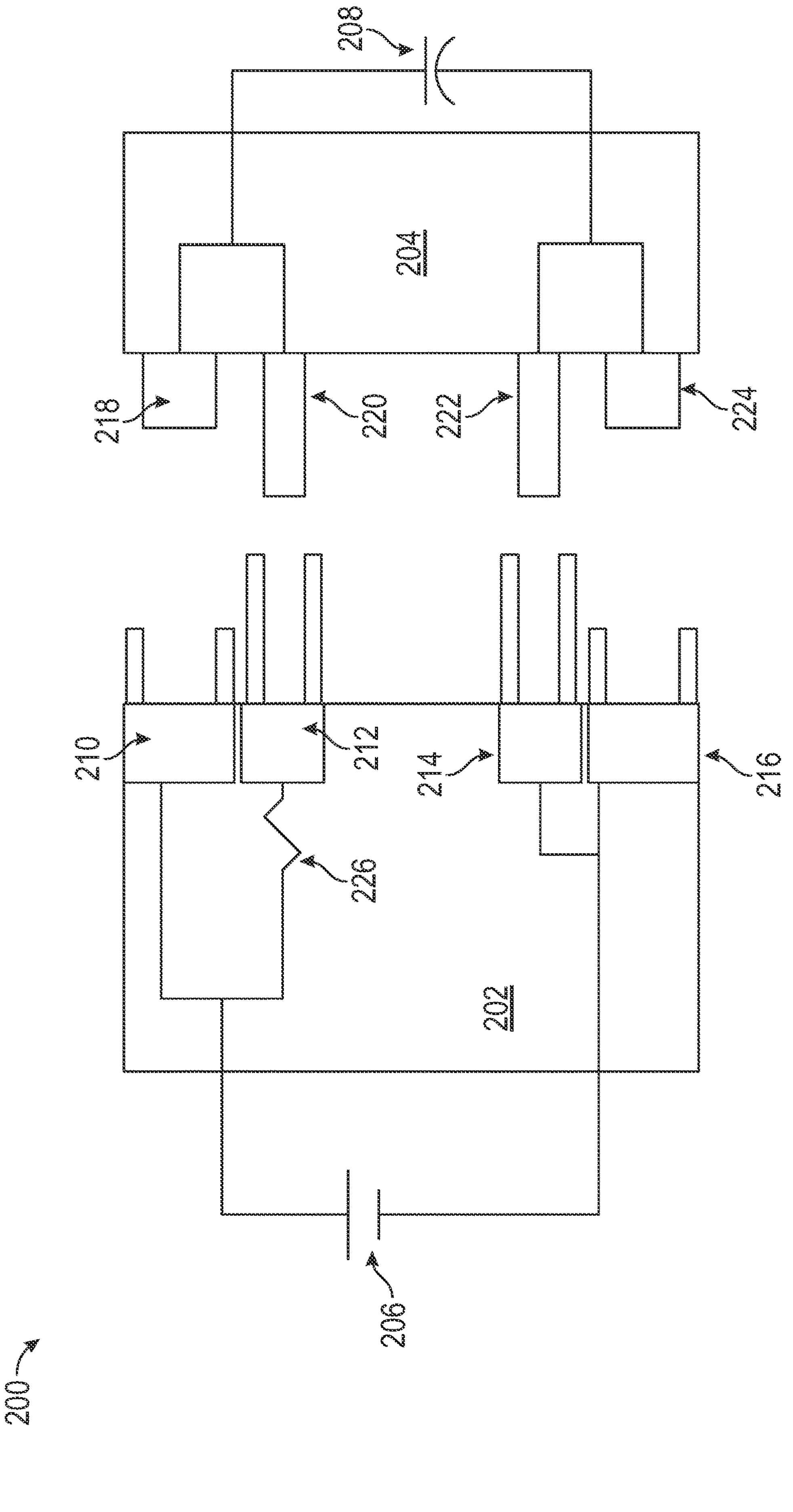
FIG. 2A is a diagram illustrating a schematic view of a high-voltage connector in accordance with an exemplary embodiment.

Referring now to FIG. 2A, a diagram illustrating a schematic view of a high-voltage connector 200 in accordance with an exemplary embodiment is shown. As illustrated, the high-voltage connector 200 includes a first member 202 that is electrically connected to a high-voltage source 206. In exemplary embodiments, the high-voltage source 206 is a battery pack having a direct current (DC) voltage of at least two hundred volts. In another embodiment, the high-voltage source 206 has a voltage between thirty and fifty volts. The high-voltage connector 200 also includes a second member 204 that is electrically connected to a capacitive load 208. In exemplary embodiments, the capacitive load 208 includes one of a DC/DC converter and an inverter that is used to control a motor. The first member 202 and the second member 204 are configured to be removably connected to one another to supply electricity from the high-voltage source 206 to the capacitive load 208.

In exemplary embodiments, the first member 202 of the high-voltage connector 200 includes a first positive conductor 210 and a second positive conductor 212 that are both connected to the high-voltage source 206. In one embodiment, the first positive conductor 210 is in parallel with a series combination of the second positive conductor 212 and the pre-charge resistor 226. The first member 202 of the high-voltage connector 200 also includes a first negative conductor 214 and a second negative conductor 216 that are connected to one another in parallel. In exemplary embodiments, the second member 204 of the high-voltage connector 200 includes a third positive conductor 218 and a fourth positive conductor 220 that are connected to one another in parallel. The second member 204 of the high-voltage connector 200 also includes a third negative conductor 222 and a fourth negative conductor 224 that are connected to one another in parallel.

In exemplary embodiments, the first member 202 of the high-voltage connector 200 includes a pre-charge resistor 226 that is connected between the high-voltage source 206 and the second positive connector 212. In exemplary embodiments, the pre-charge resistor 226 has a resistance of approximately twenty to sixty Ohms. In exemplary embodiments, the value of the pre-charge resistor 226 is based on the value of the capacitive load, the allowable inrush current, and the required pre-charge time. As illustrated, the second positive conductor 212 of the first member 202 and the fourth positive conductor 220 of the second member 204 are configured to extend further from a body of the first member 202 and of the second member 204 than the first positive conductor 210 and the third positive conductor 218, respectively. Likewise, the first negative conductor 214 of the first member 202 and the third negative conductor 222 of the second member 204 are configured to extend further from a body of the first member 202 and of the second member 204 than the second negative conductor 216 and the fourth negative conductor 224, respectively.

In exemplary embodiments, when the first member 202 is first connected to the second member 204 an electrical connection between the high-voltage source 206 and the capacitive load 208 is established through the pre-charge resistor 226, the second positive conductor 212, the fourth positive conductor 220, the third negative conductor 222 and the first negative conductor 214. As a result, the current flowing through this electrical connection will be limited by the pre-charge resistor 226 and will limit an in rush of current to the capacitive load 208. In exemplary embodiments, the lengths of the conductors 210, 212, 214, 216, 218, 222, and 224 are configured such that a suitable delay is created between when the second positive conductor 212 contacts the fourth positive conductor 220 and when the first positive conductor 210 contacts the third positive conductor 218 to allow for the capacitors of the capacitive load 208 to efficiently charge. In one embodiment, this delay is approximately two hundred milliseconds.

Figure 2B:
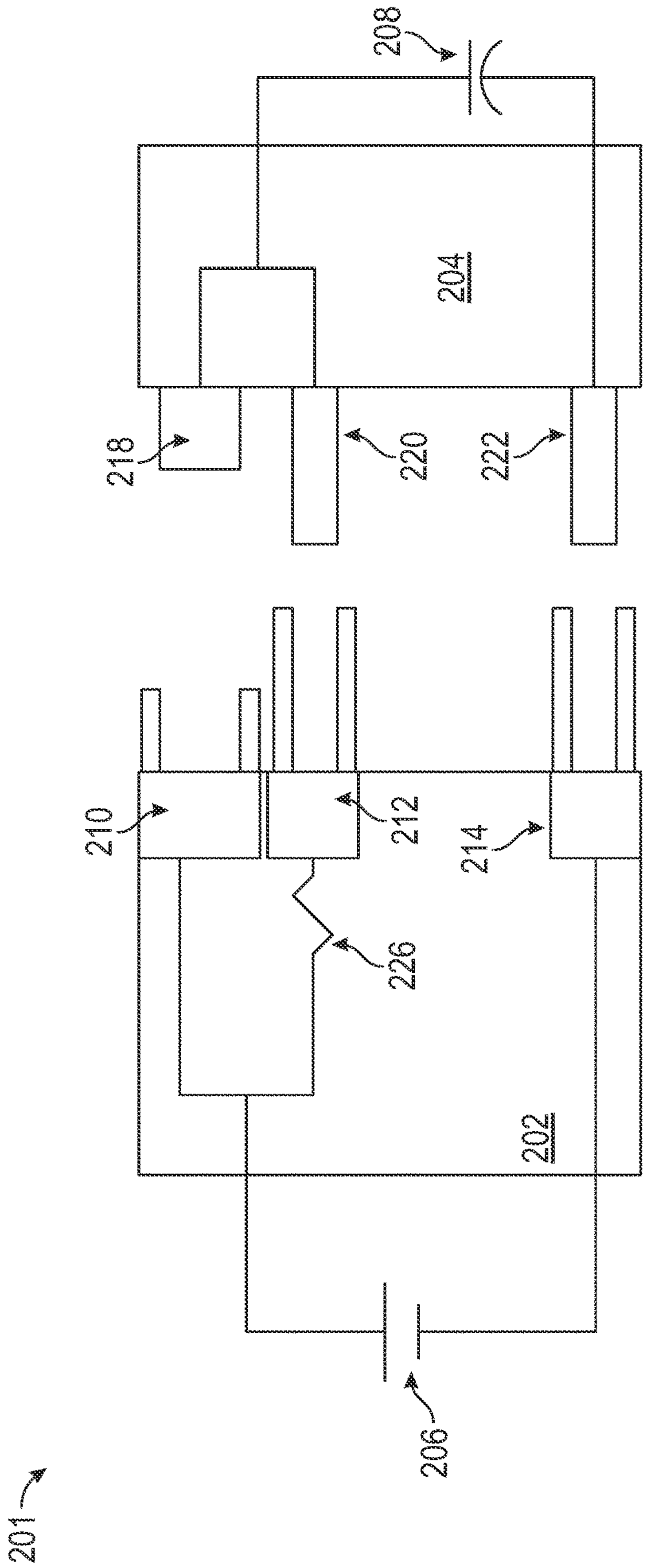
FIG. 2B is a diagram illustrating a schematic view of a high-voltage connector in accordance with an exemplary embodiment.

Referring now to FIG. 2B, a diagram illustrating a schematic view of a high-voltage connector 201 in accordance with an exemplary embodiment is shown. In the illustrated embodiment, the first member 202 of the high-voltage connector 201 includes a first positive conductor 210 connected in parallel to a combination of the second positive conductor 212 and the pre-charge resistor 226. The first member 202 of the high-voltage connector 201 also includes a first negative conductor 214. In exemplary embodiments, the second member 204 of the high-voltage connector 201 includes a third positive conductor 218 and a fourth positive conductor 220 that are connected to one another in parallel. The second member 204 of the high-voltage connector 201 also includes a third negative conductor 222.

In exemplary embodiments, when the first member 202 is first connected to the second member 204 an electrical connection between the high-voltage source 206 and a capacitive load 208 is established through the pre-charge resistor 226, the second positive conductor 212, the fourth positive conductor 220, the third negative conductor 222 and the first negative conductor 214. As a result, the current flowing through this electrical connection will be limited by the pre-charge resistor 226 and will limit an in rush of current to the capacitive load 208. In exemplary embodiments, the lengths of the conductors 210, 212, 214, 218, and 222 are configured such that a suitable delay is created between when the second positive conductor 212 contacts the fourth positive conductor 220 and when the first positive conductor 210 contacts the third positive conductor 218 to allow for the capacitors of the capacitive load 208 to efficiently charge. In one embodiment, this delay is approximately two hundred milliseconds.

Figure 3:
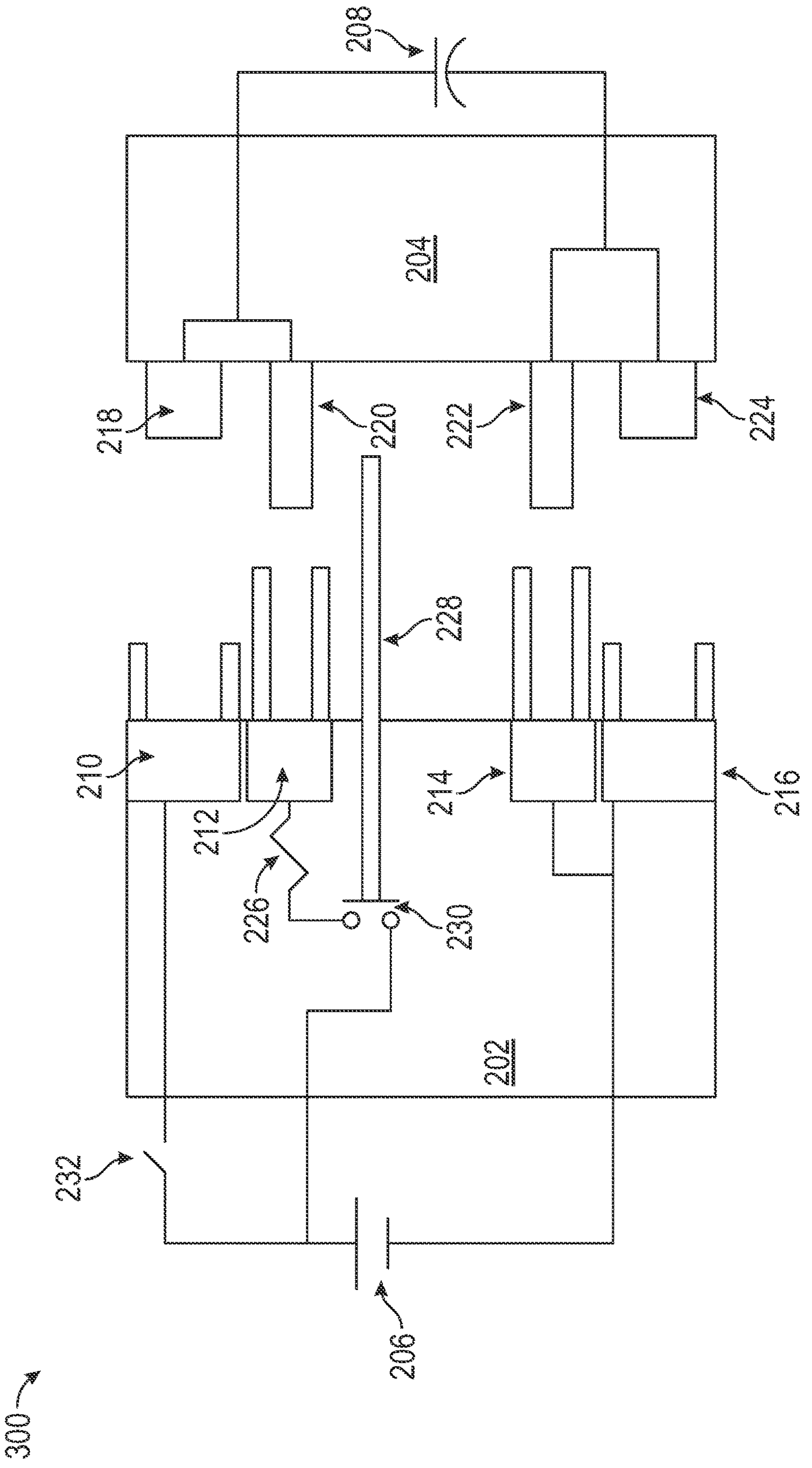
FIG. 3 is a diagram illustrating a schematic view of a high-voltage connector in accordance with an exemplary embodiment.

Referring now to FIG. 3, a diagram illustrating a schematic view of a high-voltage connector 300 in accordance with an exemplary embodiment is shown. As illustrated, the high-voltage connector 300 includes a first member 202 that is electrically connected to a high-voltage source 206. The high-voltage connector 300 also includes a second member 204 that is electrically connected to a capacitive load 208. The first member 202 and the second member 204 are configured to be removably connected to one another to supply electricity from the high-voltage source 206 to the capacitive load 208.

In exemplary embodiments, the first member 202 of the high-voltage connector 300 includes a first mechanically actuated switch 230 that is connected in series between the second positive conductor 212 and the high-voltage source 206. In exemplary embodiments, the switch 230 is configured to be in an open position when the first member 202 is disconnected from the second member 204. The first mechanically actuated switch 230 is configured to be selectively activated by a plunger 228 that extends from the body of the first member 202 in the same direction as the second positive conductor 212. In exemplary embodiments, as the first member 202 is connected to the second member 204, the plunger 228 is pressed into the body of the first member 202 forcing the switch 230 into a closed position.

In exemplary embodiments, the high-voltage connector 300 also includes a third mechanically actuated switch 232 that is connected in series between the first positive conductor 210 and the high-voltage source 206. In exemplary embodiments, the third mechanically actuated switch 232 is disposed outside of a body portion of the first member 202 and is configured to be selectively activated by a user once the first member 202 has been fully seated with the second member 204.

In exemplary embodiments, when the first member 202 is connected to the second member 204 an electrical connection between the high-voltage source 206 and the capacitive load 208 is established through the switch 230, the pre-charge resistor 226, the second positive conductor 212, the fourth positive conductor 220, the third negative conductor 222 and the first negative conductor 214. As a result, the current flowing through this electrical connection will be limited by the pre-charge resistor 226 and will limit an in rush of current to the capacitive load 208. Once the third mechanically actuated switch 232 is closed, a second electrical connection between the high-voltage source 206 and the capacitive load 208 is established through the first positive conductor 210 and the third positive conductor 218.

Figure 4:
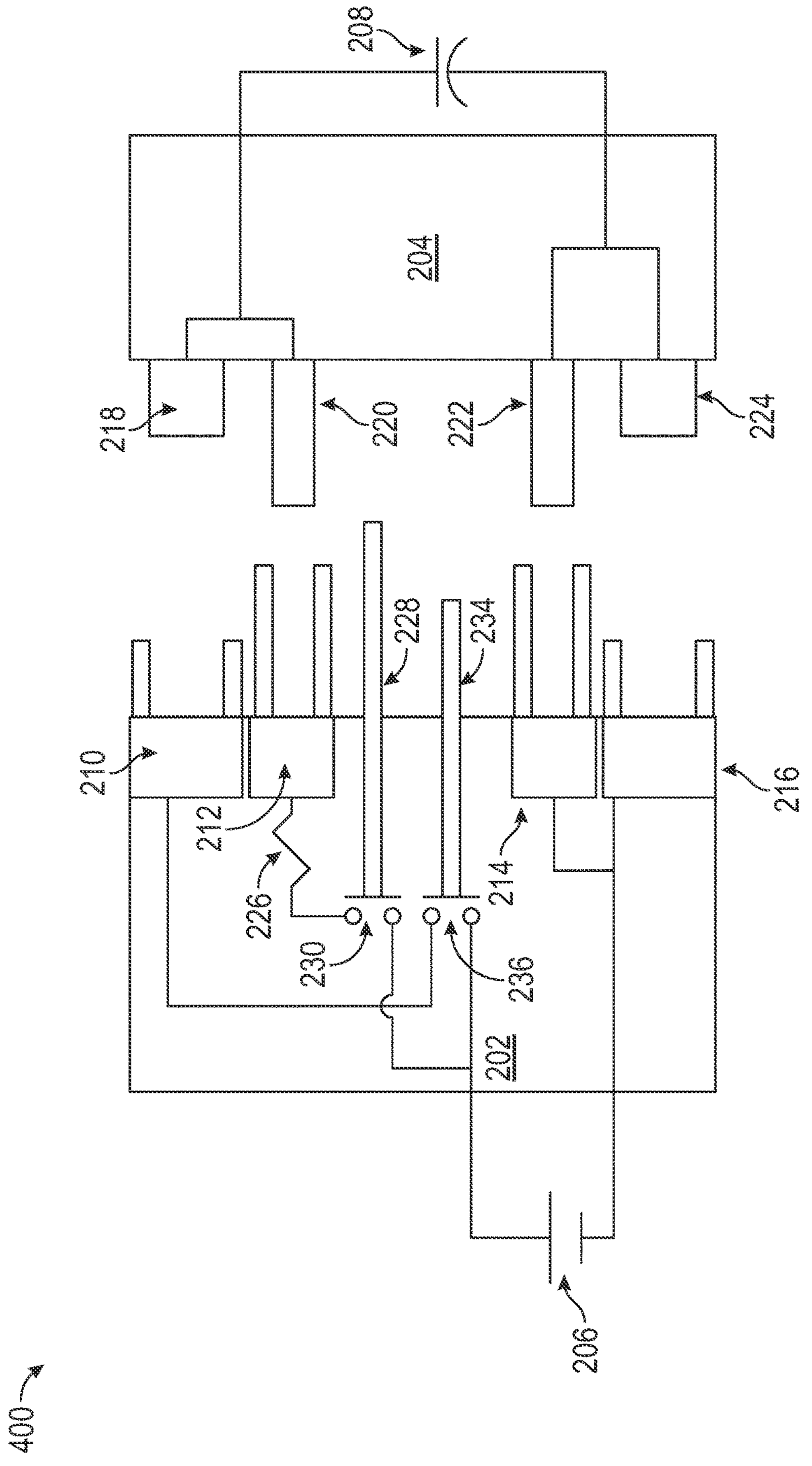
FIG. 4 is a diagram illustrating a schematic view of a high-voltage connector in accordance with an exemplary embodiment.

Referring now to FIG. 4, a diagram illustrating a schematic view of a high-voltage connector 400 in accordance with an exemplary embodiment is shown. As illustrated, the high-voltage connector 400 includes a first member 202 that is electrically connected to a high-voltage source 206. The high-voltage connector 400 also includes a second member 204 that is electrically connected to a capacitive load 208. The first member 202 and the second member 204 are configured to be removably connected to one another to supply electricity from the high-voltage source 206 to the capacitive load 208.

In exemplary embodiments, the first member 202 of the high-voltage connector 400 includes a first mechanically actuated switch 230 that is connected in series between the second positive conductor 212 and the high-voltage source 206 and a second mechanically actuated switch 236 that is connected in series between the first positive conductor 210 and the high-voltage source 206. In exemplary embodiments, the first mechanically actuated switch 230 and the second first mechanically actuated switch 236 are configured to be in an open position when the first member 202 is disconnected from the second member 204.

The first mechanically actuated switch 230 is configured to be selectively activated by a plunger 228 that extends from the body of the first member 202 in the same direction as the second positive conductor 212. Likewise, the second mechanically actuated switch 236 is configured to be selectively activated by a plunger 234 that extends from the body of the first member 202 in the same direction as the second positive conductor 212. In exemplary embodiments, as the first member 202 is connected to the second member 204, the plungers 228, 234 are pressed into the body of the first member 202 forcing the switches 230, 236 into a closed position.

In exemplary embodiments, the plunger 228 extends further from the body of the first member 202 than the plunger 234, (i.e., plunger 228 has a length greater than the length of plunger 234). In exemplary embodiments, the plungers 228 and 234 are configured such that a suitable delay is created between when the first mechanically actuated switch 230 and the second mechanically actuated switch 236 are closed to allow for the capacitors of the capacitive load 208 to efficiently charge. In one embodiment, this delay is approximately two hundred milliseconds.

Figure 5:
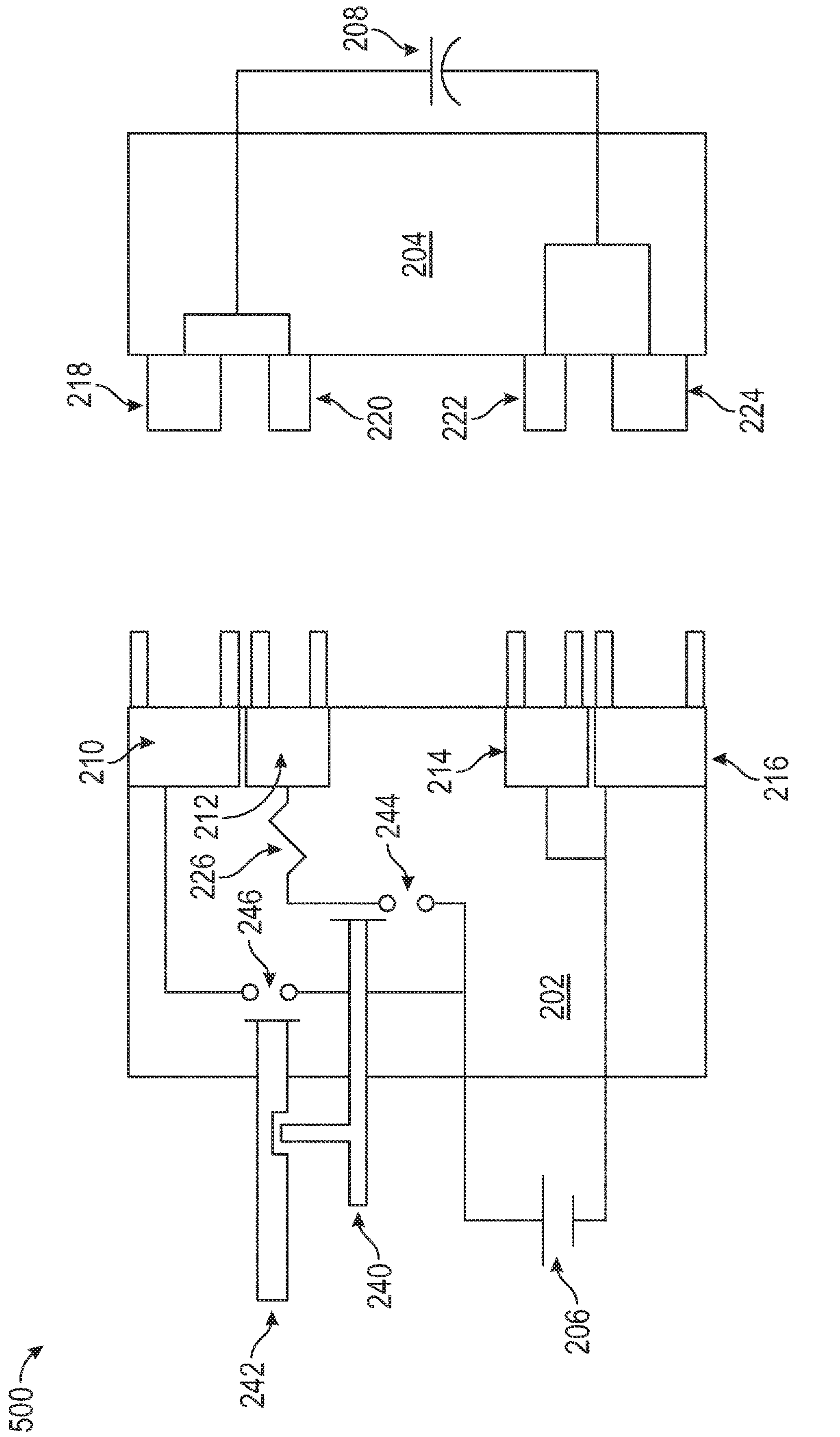
FIG. 5 is a diagram illustrating a schematic view of a high-voltage connector in accordance with an exemplary embodiment.

Referring now to FIG. 5, a diagram illustrating a schematic view of a high-voltage connector in accordance with an exemplary embodiment is shown. As illustrated, the high-voltage connector 500 includes a first member 202 that is electrically connected to a high-voltage source 206. The high-voltage connector 500 also includes a second member 204 that is electrically connected to a capacitive load 208. The first member 202 and the second member 204 are configured to be removably connected to one another to supply electricity from the high-voltage source 206 to the capacitive load 208.

In exemplary embodiments, the first member 202 of the high-voltage connector 500 includes a fourth mechanically actuated switch 244 that is connected in series between the second positive conductor 212 and the high-voltage source 206 and a fifth mechanically actuated switch 246 that is connected in series between the first positive conductor 210 and the high-voltage source 206. In exemplary embodiments, the fourth mechanically actuated switch 244 is selectively activated using a lever 240, and the fifth mechanically actuated switch 246 is selectively activated using a lever 242. In exemplary embodiments, levers 240, 242 are configured to be activated after the first member 202 has been fully connected to the second member 204. In one embodiment, the levers 240, 242 are configured in an interlocking manner such that lever 242 can not be placed into a closed position while lever 240 is in an open position.

In the embodiment illustrated in FIG. 5, once the first member 202 is connected to the second member 204, current will not flow from the high-voltage source 206 to the capacitive load 208 until after lever 240 is placed in a closed position, thereby closing switch 244. Once switch 244 is closed, current from the high-voltage source 206 will flow to the capacitive load 208 through the pre-charge resistor 226, thereby limiting an in rush of current into the capacitive load 208. After lever 240 is placed in the closed position, lever 242 is able to be closed to permit current to flow through switch 246.

Figure 6:
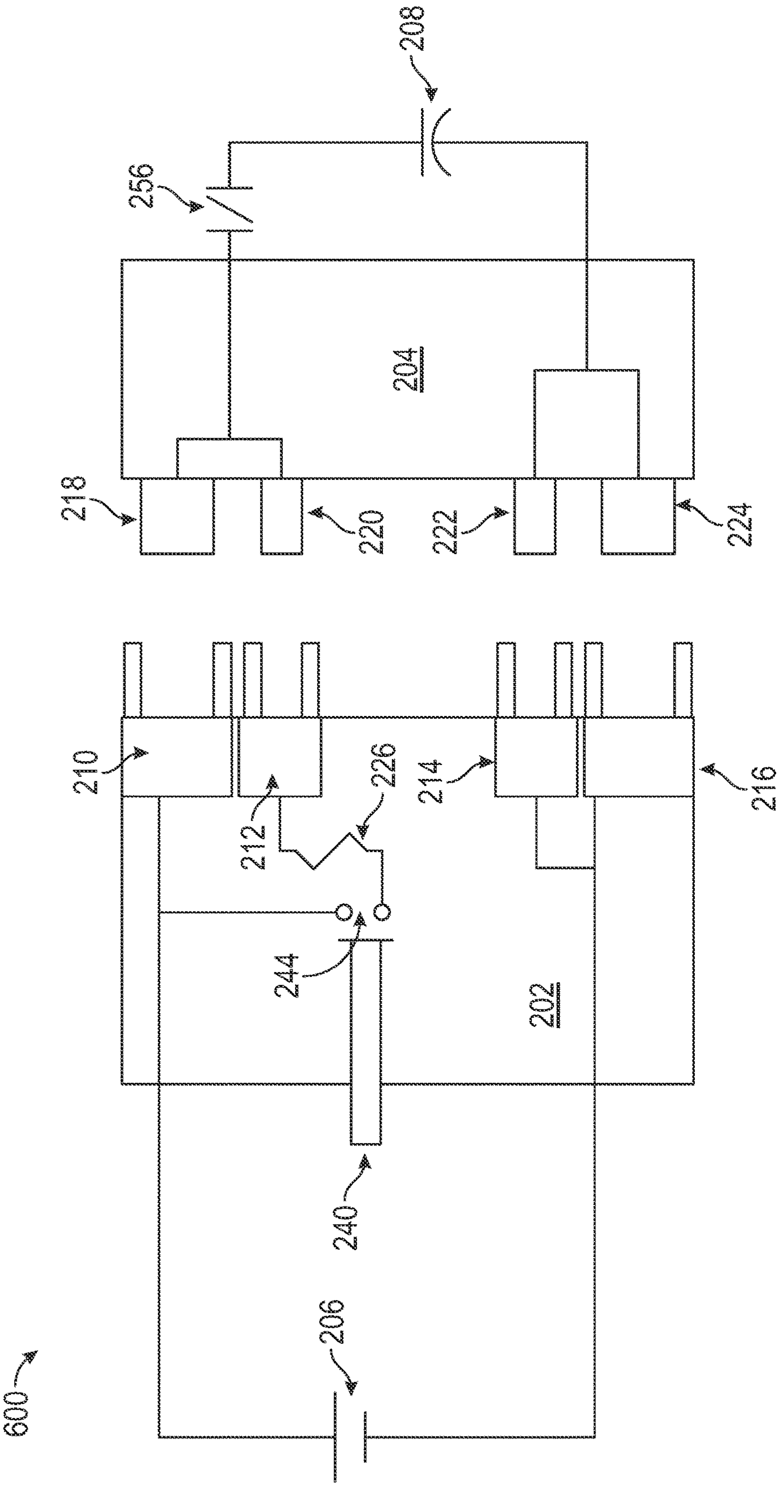
FIG. 6 is a diagram illustrating a schematic view of a high-voltage connector in accordance with an exemplary embodiment.

Referring now to FIG. 6, a diagram illustrating a schematic view of a high-voltage connector in accordance with an exemplary embodiment is shown. As illustrated, the high-voltage connector 600 includes a first member 202 that is electrically connected to a high-voltage source 206. The high-voltage connector 600 also includes a second member 204 that is electrically connected to a capacitive load 208. The first member 202 and the second member 204 are configured to be removably connected to one another to supply electricity from the high-voltage source 206 to the capacitive load 208.

In exemplary embodiments, the first member 202 of the high-voltage connector 600 includes a fourth mechanically actuated switch 244 that is connected in series between the second positive conductor 212 and the high-voltage source 206. In exemplary embodiments, the fourth mechanically actuated switch 244 is selectively activated using a lever 240, which is at least partially disposed outside of the body of the first member 202. Once the first member 202 is connected to the second member 204, current can not flow from the high-voltage source 206 to the capacitive load 208 until after lever 240 is placed in a closed position, thereby closing switch 244. Once switch 244 is closed, current from the high-voltage source 206 can flow to the capacitive load 208 through the pre-charge resistor 226, assuming a relay 256 is in a closed position, thereby limiting an in rush of current into the capacitive load 208.

In exemplary embodiments, the high-voltage connector 600 includes a relay 256 disposed between both the third positive conductor 218 and the third positive conductor 220 and the capacitive load 208. In exemplary embodiments, the relay 256 is an electrically activated switch that is normally in a closed position. In one embodiment, the relay 256 is controlled by the controller 102, shown in FIG. 1.

Figure 7:
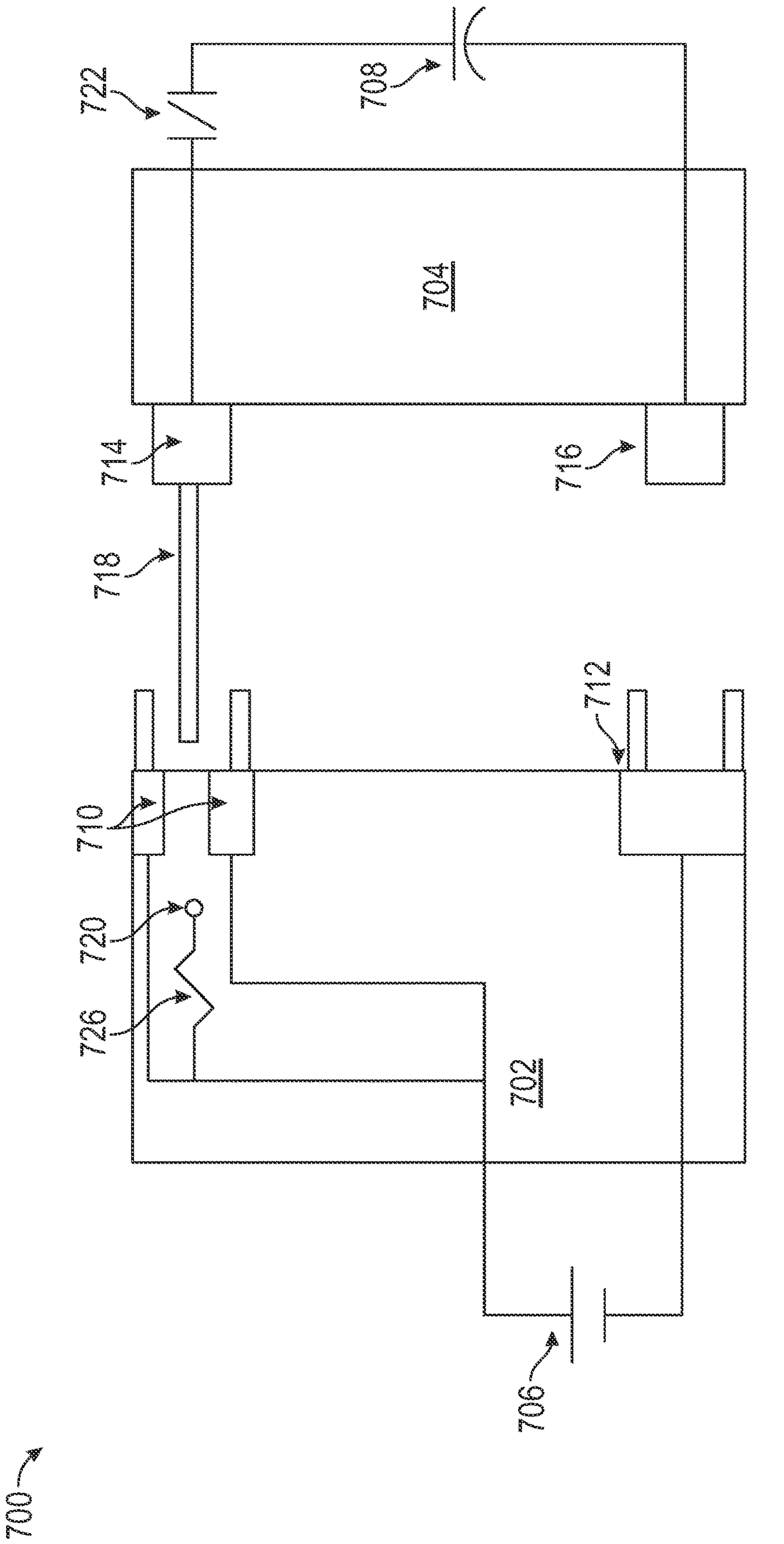
FIG. 7 is a diagram illustrating a schematic view of a high-voltage connector in accordance with an exemplary embodiment.

Referring now to FIG. 7, a diagram illustrating a schematic view of a high-voltage connector in accordance with an exemplary embodiment is shown. As illustrated, the high-voltage connector 700 includes a first member 702 that is electrically connected to a high-voltage source 706. The high-voltage connector 700 also includes a second member 704 that is electrically connected to a capacitive load 708. The first member 702 and the second member 704 are configured to be removably connected to one another to supply electricity from the high-voltage source 706 to the capacitive load 708.

In exemplary embodiments, the first member 702 includes a first positive conductor 710, a first negative conductor 712 and the second member 704 includes a second positive conductor 714 and a second negative conductor 716. In one embodiment, the first member 702 includes a pre-charge resistor 726 that is connected in parallel to the first positive conductor 710. The pre-charge resistor 726 is disposed in series between the high-voltage source 706 and a contact 720.

In exemplary embodiments, the second positive conductor 714 of the second member 704 includes an extended portion 718 that is configured to touch the contact 720 as the first member 702 is connected to the second member 704 prior to the first positive member 710 contacting the second positive conductor 714. In exemplary embodiments, the lengths of the conductors 710, 714 and the extended portion 718 are configured such that a suitable delay is created between when the contact 720 touches the extended portion 718 of the second positive conductor 714 and when the first positive conductor 710 contacts the second positive conductor 714 to allow for the capacitors of the capacitive load 708 to efficiently charge. In one embodiment, this delay is approximately two hundred milliseconds.

In exemplary embodiments, the high-voltage connector 700 optionally includes a relay 722 disposed between both the second positive conductor 714 and the capacitive load 708. In exemplary embodiments, the relay 722 is an electrically activated switch that is normally in a closed position. In one embodiment, the relay 722 is controlled by the controller 102, shown in FIG. 1.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A high-voltage connector comprising:

a first member electrically connected to a high-voltage source, wherein the high-voltage source has a direct current voltage in excess of two hundred volts, the first member includes a first positive conductor and a second positive conductor and a first negative conductor and a second negative conductor;

a second member electrically connected to a load that requires pre-charging, the second member includes a third positive conductor and a fourth positive conductor connected in parallel and a third negative conductor and a fourth negative conductor connected in parallel; and a pre-charge resistor disposed within one of the first member and the second member, the pre-charge resistor connected in series between the second positive conductor and the high-voltage source, wherein the pre-charge resistor has a resistance of approximately twenty to sixty Ohms, wherein the first member is configured to connect to the second member and to provide electrical power from the high-voltage source to the load, wherein, when the first member is first connected to the second member, an electrical connection between the high-voltage source and the load is established through the pre-charge resistor, the second positive conductor, the fourth positive conductor, the third negative conductor, and the first negative conductor before an electrical connection is established through the first positive conductor and the third positive conductor, and wherein the lengths of the conductors are configured such that a delay of approximately two hundred milliseconds is created between when the second positive conductor contacts the fourth positive conductor and when the first positive conductor contacts the third positive conductor.

2. The high-voltage connector of claim 1, wherein the first positive conductor extends from the first member by a first distance and the second positive conductor extends from the first member by a second distance, wherein the second distance is greater than the first distance and wherein the pre-charge resistor is connected to the second positive conductor.

3. The high-voltage connector of claim 2, wherein the third positive conductor extends from the second member by a third distance and the fourth positive conductor extends from the second member by a fourth distance, wherein the fourth distance is greater than the third distance.

4. The high-voltage connector of claim 1, further comprising a first mechanically actuated switch configured to be open when the first member is separated from the second member and to be closed by the first member connecting to the second member.

5. The high-voltage connector of claim 4, wherein the first mechanically actuated switch is connected in series with the pre-charge resistor.

6. The high-voltage connector of claim 4, further comprising a second mechanically actuated switch configured to be open when the first member is separated from the second member and to be closed by the first member connecting to the second member.

7. The high-voltage connector of claim 6, wherein the first mechanically actuated switch is configured to close before the second mechanically actuated switch as the first member is connected to the second member.

8. An electric vehicle comprising:

a high-voltage battery, wherein the high-voltage battery has a direct current voltage in excess of two hundred volts;

a load that requires pre-charging; and a high-voltage connector comprising:

a first member electrically connected to the high-voltage battery, the first member includes a first positive conductor and a second positive conductor and a first negative conductor and a second negative conductor;

a second member electrically connected to the load, the second member includes a third positive conductor and a fourth positive conductor connected in parallel and a third negative conductor and a fourth negative conductor connected in parallel; and a pre-charge resistor disposed within one of the first member and the second member, the pre-charge resistor connected in series between the second positive conductor and the high-voltage battery, wherein the pre-charge resistor has a resistance of approximately twenty to sixty Ohms, wherein the high-voltage connector is configured provide electrical power from the high-voltage battery to the load, wherein, when the first member is first connected to the second member, an electrical connection between the high-voltage battery and the load is established through the pre-charge resistor, the second positive conductor, the fourth positive conductor, the third negative conductor, and the first negative conductor before an electrical connection is established through the first positive conductor and the third positive conductor, and wherein the lengths of the conductors are configured such that a delay of approximately two hundred milliseconds is created between when the second positive conductor contacts the fourth positive conductor and when the first positive conductor contacts the third positive conductor.

9. The electric vehicle of claim 8, wherein the first positive conductor extends from the first member by a first distance and the second positive conductor extends from the first member by a second distance, wherein the second distance is greater than the first distance and wherein the pre-charge resistor is connected to the second positive conductor.

10. The electric vehicle of claim 9, wherein the third positive conductor extends from the second member by a third distance and the fourth positive conductor extends from the second member by a fourth distance, wherein the fourth distance is greater than the third distance.

11. The electric vehicle of claim 8, wherein the high-voltage connector further comprises a first mechanically actuated switch configured to be open when the first member is separated from the second member and to be closed by the first member connecting to the second member.

12. The electric vehicle of claim 11, wherein the first mechanically actuated switch is connected in series with the pre-charge resistor.

13. The electric vehicle of claim 11, wherein the high-voltage connector further comprises a second mechanically actuated switch configured to be open when the first member is separated from the second member and to be closed by the first member connecting to the second member.

14. The electric vehicle of claim 13, wherein the first mechanically actuated switch is configured to close before the second mechanically actuated switch as the first member is connected to the second member.

15. A electrical connector comprising:

a first member electrically connected to a high-voltage source, the first member includes a first positive conductor and a second positive conductor and a first negative conductor;

a second member electrically connected to a load that requires pre-charging, the second member includes a third positive conductor and a fourth positive conductor and a third negative conductor;

a pre-charge resistor disposed within one of the first member and the second member, the pre-charge resistor connected in series between the second positive conductor and the high-voltage source;

a first mechanically actuated switch configured to be open when the first member is separated from the second member and to be closed by the first member connecting to the second member;

a second mechanically actuated switch configured to be open when the first member is separated from the second member and to be closed by the first member connecting to the second member, wherein the first member is configured to connect to the second member and to provide electrical power from the high-voltage source to the load, and wherein the first mechanically actuated switch is configured to close before the second mechanically actuated switch as the first member is connected to the second member.

16. The electrical connector of claim 15, wherein the first positive conductor extends from the first member by a first distance and the second positive conductor extends from the first member by a second distance, wherein the second distance is greater than the first distance and wherein the pre-charge resistor is connected to the second positive conductor.

17. The electrical connector of claim 16, wherein the third positive conductor extends from the second member by a third distance and the fourth positive conductor extends from the second member by a fourth distance, wherein the fourth distance is greater than the third distance.

18. The electrical connector of claim 15, wherein the first mechanically actuated switch is connected in series with the pre-charge resistor.

* * * * *